(12) United States Patent
Butler (10) Patent No.: US 9,626,528 B2
(45) Date of Patent: Apr. 18, 2017

(54) DATA LEAK PREVENTION ENFORCEMENT BASED ON LEARNED DOCUMENT CLASSIFICATION

(71) Applicant: International Business Machines Corporation, Armonk, NY (US)

(72) Inventor: Anthony M. Butler, Mirdif (AE)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 14/201,107

(22) Filed: Mar. 7, 2014

(65) Prior Publication Data
US 2015/0254469 A1    Sep. 10, 2015

(51) Int. Cl.
*G06F 15/18* (2006.01)
*G06F 21/62* (2013.01)
*G06N 99/00* (2010.01)
*G06N 5/02* (2006.01)

(52) U.S. Cl.
CPC ....... *G06F 21/6218* (2013.01); *G06N 99/005* (2013.01); *G06N 5/025* (2013.01)

(58) Field of Classification Search
CPC ....... H04L 63/20; H04L 63/10; G06F 21/552; G06F 21/6245
USPC .................................................... 706/12, 45
See application file for complete search history.

(56) References Cited

U.S. PATENT DOCUMENTS

| 8,352,535 | B2 |   | 1/2013  | Peled et al. |           |
|-----------|----|---|---------|--------------|-----------|
| 8,463,815 | B1 | * | 6/2013  | Zoellner     | G06F 17/3012 |
|           |    |   |         |              | 707/694   |
| 8,549,643 | B1 | * | 10/2013 | Shou         | G06F 21/556 |
|           |    |   |         |              | 455/410   |
| 9,021,389 | B1 | * | 4/2015  | Torney       | G06F 21/60 |
|           |    |   |         |              | 715/808   |
| 9,235,562 | B1 | * | 1/2016  | Hart         | G06F 17/27 |
| 2008/0060080 | A1 | * | 3/2008 | Lim        | G06F 21/62 |
|           |    |   |         |              | 726/26    |
| 2008/0082538 | A1 | * | 4/2008 | Meijer     | G06F 17/30575 |
| 2011/0239293 | A1 | * | 9/2011 | Perumal    | G06F 21/552 |
|           |    |   |         |              | 726/21    |
| 2012/0066487 | A1 | * | 3/2012 | Brown      | G06F 9/5083 |
|           |    |   |         |              | 713/150   |
| 2012/0109960 | A1 | * | 5/2012 | Mishina    | G06F 17/30705 |
|           |    |   |         |              | 707/737   |

(Continued)

FOREIGN PATENT DOCUMENTS

| GB | 2458568 B      | 9/2009  |
|----|----------------|---------|
| WO | 2012/154559 A1 | 11/2012 |
| WO | 2013/032422 A1 | 3/2013  |

OTHER PUBLICATIONS

Balinsk, H. et al., "Intelligent Assistant for Context-Aware Policies", 2011 International Joint Conference of IEEE, Nov. 16-18, 2011, pp. 621-630.

(Continued)

*Primary Examiner* — David Vincent
(74) *Attorney, Agent, or Firm* — Scully, Scott, Murphy & Presser, P.C.; Ronald Kaschak (57) ABSTRACT

The present disclosure relates generally to the field of automatically learning and automatically adapting to perform classification of protected data. In various examples, learning and adapting to perform classification of protected data may be implemented in the form of systems, methods and/or algorithms.

19 Claims, 5 Drawing Sheets

(56) References Cited

U.S. PATENT DOCUMENTS

| | | | |
|---|---|---|---|
| 2012/0137367 A1* | 5/2012 | Dupont | G06F 21/00 |
| | | | 726/25 |
| 2012/0210437 A1 | 8/2012 | Karande et al. | |
| 2014/0059700 A1* | 2/2014 | Kiriyama | G06F 21/62 |
| | | | 726/27 |
| 2014/0165137 A1* | 6/2014 | Balinsky | G06F 21/554 |
| | | | 726/1 |
| 2015/0163121 A1* | 6/2015 | Mahaffey | G06F 11/0766 |
| | | | 707/687 |

OTHER PUBLICATIONS http://www.primecaretech.com/services-and-solutions/data-leak-prevention/, "Comprehensive Data Leak Prevention Through Email, Hard Drive, and USB Encryption", printed Jun. 17, 2013.

* cited by examiner

FIG. 5

DATA LEAK PREVENTION ENFORCEMENT BASED ON LEARNED DOCUMENT CLASSIFICATION

BACKGROUND

Data Leak Prevention ("DLP") seeks to detect potential leaks or data breaches. This is where sensitive data (e.g., confidential data and/or data having a business value) is disclosed to unauthorized entities (typically outside a company) with data leaving the perimeter via a variety of possible ways such as, for example, through USB keys, emailing, uploading to an external website, etc. For the purposes of description, the term "perimeter" may refer to the external boundary of an organization. In a network context, it may refer to where the internal network connects with the external network (internet etc). It can also refer to delineation within an organization between divisions or where there are differing security postures.

There are three types of conventional DLP solutions typically available: (a) network DLP that monitors the egress points at the perimeter to detect unauthorized data traversing defined boundaries; (b) endpoint DLP that runs on an end user's device and monitors the end user behaviour and communications, blocking attempts to move sensitive data via unauthorized means, such as, for example, USB keys or via instant messaging; and (c) storage-based DLP solutions that deal with data residing on a server or device; these storage-based DLP solutions may, for example, mitigate against the risk of a person's computer (e.g., laptop computer) going missing and an unauthorized party being able to retrieve the sensitive data directly off of the storage (e.g., hard drive) of the computer. For the purposes of description, the term "defined boundaries" may refer to the delineations that can exist within an organization, between organizations, or between an organization and the outside world. They are essentially enforcement points where the flow of traffic may be controlled due to differences in the sensitivity.

Although conventional enforcement and blocking mechanisms are relatively mature, the mechanisms by which these solutions determine what is and what is not sensitive data are relatively immature and are typically based primarily on heuristics (such as word scanning, data types, and pattern matching against a lexicon of sensitive terms, or similar). Two specific examples are scanning for credit card numbers in an email or data that resembles patient records in a hospital. The drawbacks of this approach are that: (a) this approach typically requires a human to determine the uniquely identifying characteristics of the data that must be prevented from being leaked; and (b) this approach typically does not evolve or adapt over time without human intervention to update the filters, heuristics or similar.

SUMMARY

The present disclosure relates generally to the field of automatically learning and automatically adapting to perform classification of protected data. In various examples, learning and adapting to perform classification of protected data may be implemented in the form of systems, methods and/or algorithms.

In one embodiment, an automated method for data leak prevention is provided, the method comprising: obtaining, automatically by a processor, a plurality of training documents, each of the training documents including at least respective content and respective metadata; generating a classification model, automatically by the processor, wherein the classification model is generated, based at least in part upon the content and metadata of each of the training documents; obtaining, automatically by the processor, at least one non-training document, wherein the non-training document includes at least respective content; applying to the non-training document, automatically by the processor, the classification model in order to classify the non-training document into one of at least two categories; monitoring, automatically by the processor, for attempted access to the non-training document; and taking action, automatically by the processor, when the monitoring determines the existence of the attempted access to the non-training document; wherein the action that is taken is based upon the category into which the non-training document to which access is attempted has been classified; and wherein the action that is taken comprises one of: (a) denying access to the non-training document to which access is attempted; (b) logging the attempted access to the non-training document to which access is attempted; and (c) a combination thereof.

In another embodiment, a computer readable storage medium, tangibly embodying a program of instructions executable by the computer for automated data leak prevention is provided, the program of instructions, when executing, performing the following steps: obtaining automatically a plurality of training documents, each of the training documents including at least respective content and respective metadata; generating automatically a classification model, wherein the classification model is generated, based at least in part upon the content and metadata of each of the training documents; obtaining automatically at least one non-training document, wherein the non-training document includes at least respective content; applying automatically to the non-training document the classification model in order to classify the non-training document into one of at least two categories; monitoring automatically for attempted access to the non-training document; and taking action automatically when the monitoring determines the existence of the attempted access to the non-training document; wherein the action that is taken is based upon the category into which the non-training document to which access is attempted has been classified; and wherein the action that is taken comprises one of: (a) denying access to the non-training document to which access is attempted; (b) logging the attempted access to the non-training document to which access is attempted; and (c) a combination thereof.

In another embodiment, a computer-implemented system for automatic data leak prevention is provided, the system comprising: a first obtaining element configured to obtain automatically a plurality of training documents, each of the training documents including at least respective content and respective metadata; a first generating element configured to generate automatically a classification model, wherein the classification model is generated, based at least in part upon the content and metadata of each of the training documents; a second obtaining element configured to obtain automatically at least one non-training document, wherein the non-training document includes at least respective content; an applying element configured to apply automatically to the non-training document the classification model in order to classify the non-training document into one of at least two categories; a monitoring element configured to monitor automatically for attempted access to the non-training document; and a taking action element configured to take action automatically when the monitoring determines the existence of the attempted access to the non-training document; wherein the action that is taken is based upon the category into which the non-training document to which access is attempted has been classified; and wherein the action that is taken comprises one of: (a) denying access to the non-training document to which access is attempted; (b) logging the attempted access to the non-training document to which access is attempted; and (c) a combination thereof.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

As described herein, various embodiments relate to mechanisms that learn and adapt to automate classification of protected (e.g., sensitive) data. The disclosed mechanisms may interface with one or more document repositories (such as SHAREPOINT or DOCUMENTUM) within an organization's environment (such as SHAREPOINT or DOCUMENTUM), and dynamically build classification models based on the data in these structured filestores. The disclosed mechanisms may then allow administrators to apply sophisticated enforcement policies based on these models and to deploy these policies to the various end point and perimeter DLP devices. For the purposes of description, the term "end point" refers to a device with which end users interact and which sits at the edges of a network (for example, it could be a laptop, a mobile phone or a PC).

In one example, the disclosed mechanisms learn what is important to an organization (e.g., what constitutes sensitive data) and the classification evolves over time based on how the data in the document management system evolves.

In another example, the disclosed mechanisms do not necessarily require all data to be in the document management system but, rather, just a sample sufficiently large to enable the mechanisms to train themselves (that is, in order to generate a set of models, it is necessary to have a "training set" of data that the model generation algorithms are applied to; if the dataset is too small then it will result in "overfitting" wherein a model is derived that fits the training set perfectly but the training set isn't genuinely representative of reality).

Figure 1:
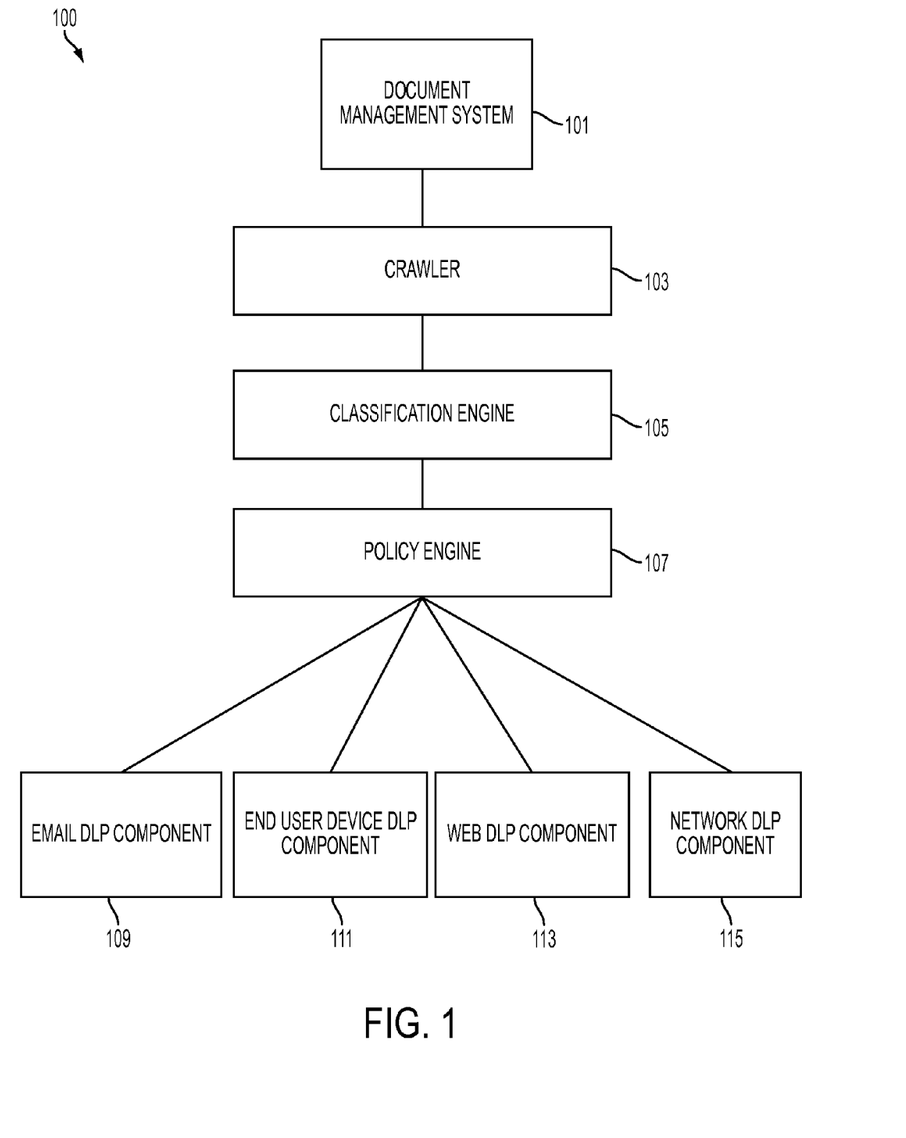
FIG. 1 depicts a block diagram of a system according to an embodiment of the present invention.

Referring now to FIG. 1, an example implementation of system 100 according to an embodiment is shown. As seen in this FIG. 1, system 100 includes document management system 101. In one example, this document management system may be a conventional document management system such as DOCUMENTUM or SHAREPOINT. The document management system is used to store documentation, manage documentation lifecycle, enforce policy and control access. As part of the document metadata, a given document's classification in accordance with a data classification policy is stored. For example, if a document is "Highly Restricted," the document will be marked as such in the document management system. In one specific example, in order for system 100 to be effective it is not necessary that the associated organization stores all of their data in the document management system but that a sizeable portion of its critical data is stored here (e.g., what this essentially means is that there must be a representative sample of data in the repository and that this data is indicative of data found elsewhere).

With reference now to the crawler component 103, it is noted that this crawler may operate by "crawling" (that is, accessing) the document management system for content (in one specific example, the crawler may access the document management system via an application programming interface (API), if such is available). The crawler may regularly poll the document management system for new documents. The identified documents that have been crawled are passed to the classification engine 105 as described below.

The classification engine is passed (from the crawler) each document and each document's associated metadata that exist in the document management system. One important element amongst this metadata is the security or data classification of the document. The classification engine uses this data to build a classification model for documents (similar to a Bayesian filter or the like). In this regard, the classification engine identifies the content and metadata attributes that are strong determinants of security classification and builds a model (this model is then published to the policy engine 107 as described below). For example, if a document contains the words SEISMOLOGY and AFRICA and is in the file format of a geographic information system (GIS) and was authored by someone from the Exploration Team in a Mining company then the document has a 90% probability of have a classification of "Highly Sensitive".

Still referring to FIG. 1, it is seen that the policy engine is populated with these models that have been derived by the classification engine. In one specific example, an administrator may then assign policies to these models. For example, the administrator may assign a policy that the above example data classification (seismology reports from Africa, etc) should be blocked from leaving the company except by people from the Exploration Team (but an attempted access event should be logged).

In addition, there are various DLP agents deployed throughout the organization on various platforms (in various examples, DLP agents may be software applications that are installed either onto an endpoint (such as a laptop, desktop, mobile device or other) or an appliance; in the former case, they will enforce policy at the end point whereas in the latter case, they will typically enforce traffic at a network level). For example, there may be an email DLP component 109 (such as an email scanning agent) that may comprise an appliance or an agent installed into an existing email server (in another example, an email scanning agent could be a simple mail transfer protocol (SMTP) server itself). This email DLP component will have policies pushed to it by the policy engine and will apply these policies to all traffic passing through it. Likewise, the other DLP components (shown as end user device DLP component 111, web DLP component 113 and Network DLP component 115) may likewise comprise a respective appliance or an agent and may likewise have policies deployed automatically to them that they will then apply. In each case, a respective policy may dictate how a breach is handled. For example, breaches with a higher confidence level may be actively blocked whereas breaches below a certain threshold may simply have the potential breach logged and an alert raised with the security team (for example, when an event occurs, it is matched against the classification model(s) and a confidence level if derived mathematically; the confidence level denotes the probability that a given event matches the model).

Figure 5:
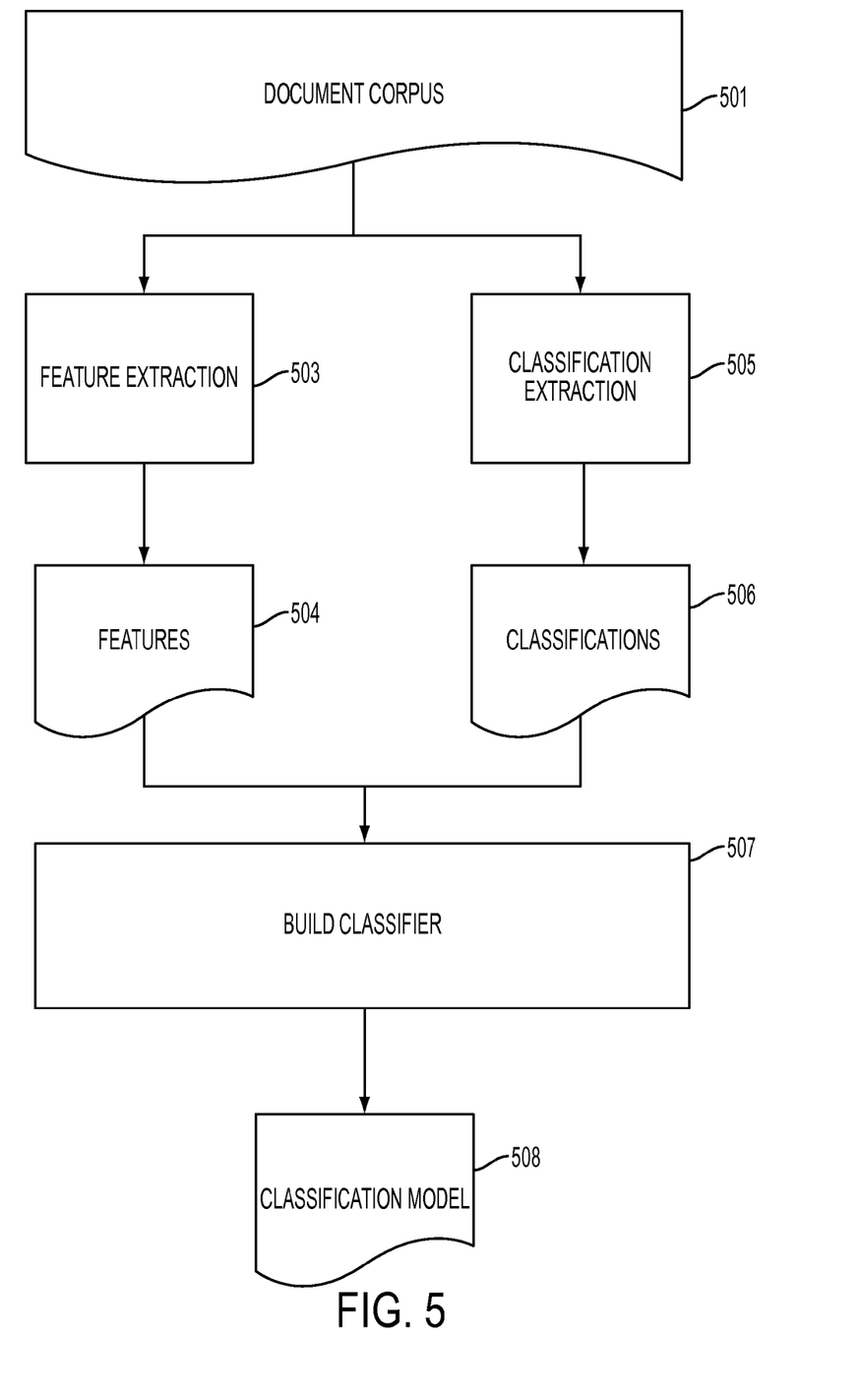
FIG. 5 depicts a block diagram of a method according to an embodiment of the present invention.

Referring now to FIG. 5, an example training process such as may be used in connection with the classification engine 105 and other elements of FIG. 1 will be described: (1) There exists a document repository which is called the document corpus 510 in this example (in one specific example, this could be a MICROSOFT SHAREPOINT or other platform). The document corpus 510 is randomly partitioned such that, e.g., 10% of the data is set aside for testing and the remainder for training (or some other split as determined by the user); (2) Data from this document corpus 510 is used for two processes—feature extraction 503 and classification label extraction 505. The classification label is the security classification of each document as listed in the document corpus 510. This is typically set by a human when they are creating/editing the document and may be stored in metadata associated with the said document. Every organization will typically be different based on their own standards but common classifications may be, for example, PUBLIC, SENSITIVE, PRIVATE and CONFIDENTIAL. In more simpler systems, it may just be PUBLIC and PRIVATE; (3) Feature extraction 503 converts the input document into a feature set where pairs of features and classifications are later fed into a classification process. Examples of features may be each word, metadata such as business unit, author name, data type, location where it was created, etc. Stemming may occur where words are reduced to their 'stems' such as "GETTING" becomes "GET", "CARS" becomes "CAR", etc; (4) The Build Classifier 507 process takes pairs of features 504 and labels 506 and generates a model. There are several algorithms that can be used to build a classifer such as, for example, a Decision Tree (C4.5, C5.0 etc. are common implementations of this technique). (5) The result is a Classification Model 508 that essentially provides rule(s) that can be used to determine the label that a given data set belongs to. For example, in the case of a decision tree, it may include rules such as IF DOCUMENT CONTAINS WORD "SEISMOLOGY" and DATA TYPE IS "WORD DOCUMENT" and AUTHOR BUSINESS UNIT is "MINERAL EXPLORATION" then label is "HIGHLY SENSITIVE". Each rule/model will also have a confidence and support value associated with it. The confidence is the likelihood of the predicted outcome (label) given the rule/model has been satisfied and the support is the number of records in the training set that resulted in this rule/model.

Next, the classifier may be tested. In this example, the test process may be as follows: (1) Once the classifier is built, the subset of the data that was set aside runs through the classifier and each resulting label is compared with the actual label as sourced from the document management system; (2) This is used to validate the accuracy of the classifier; (3) An administrator may make adjustments to the features that were selected in the previous phase. They may also apply weightings and/or make other modifications to improve the accuracy of the classification model, such as manually adding rules/models to generated rules/models to further enhance it/them.

Next, usage of rule(s)/model(s) for data leak prevention may be implemented as follows: (1) Once the classification models have been derived, they are converted into policies and deployed into various DLP components for enforcement. An administrator may associate each rule/model with an action. The action might be to BLOCK, ALERT or some other action depending on the confidence level of the rule/model associated with the action.

Figure 2:
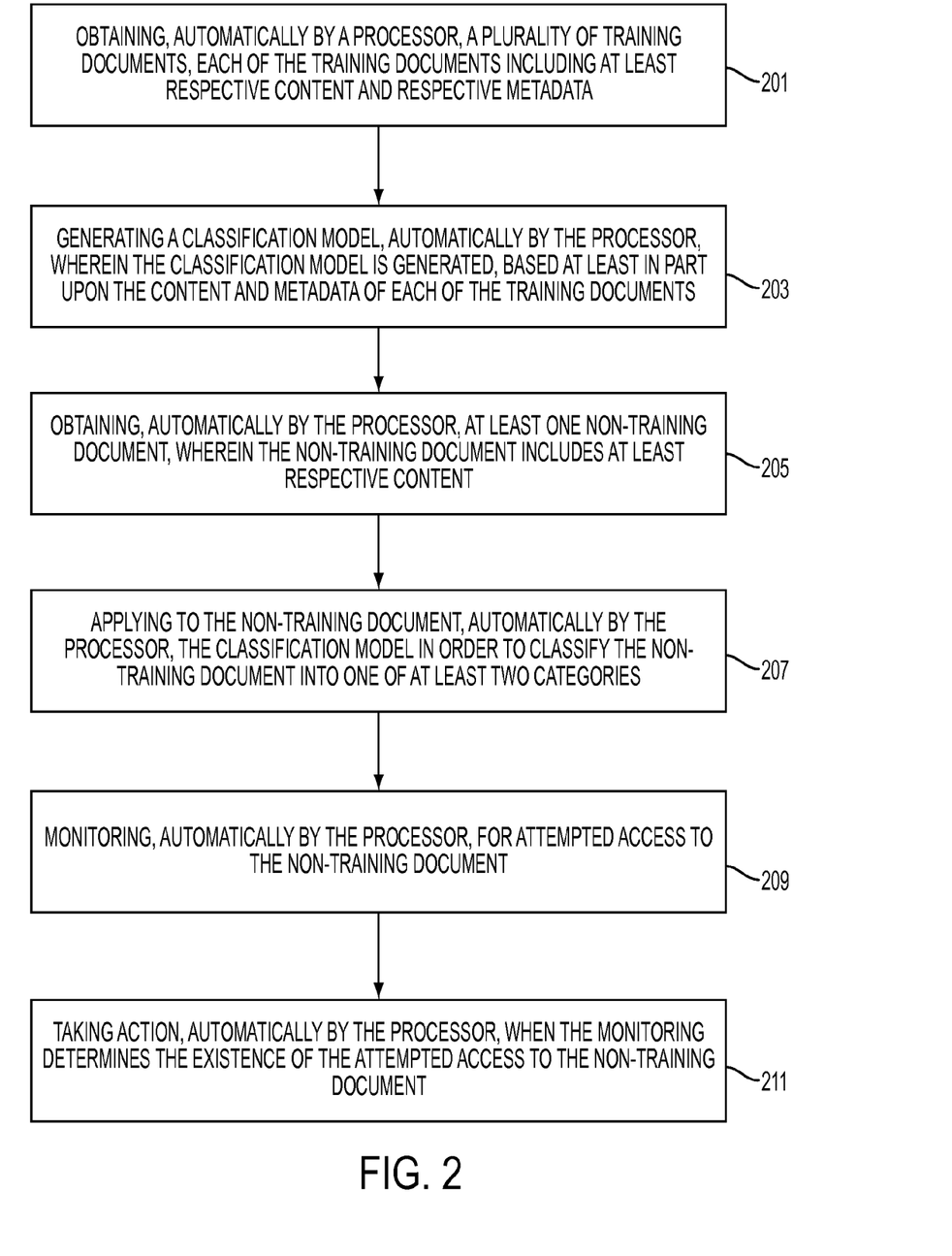
FIG. 2 depicts a block diagram of a method according to an embodiment of the present invention.

Referring now to FIG. 2, an automated method for data leak prevention is shown. As seen in FIG. 2, the method of this embodiment comprises: at 201—obtaining, automatically by a processor, a plurality of training documents, each of the training documents including at least respective content and respective metadata; at 203—generating a classification model, automatically by the processor, wherein the classification model is generated, based at least in part upon the content and metadata of each of the training documents; at 205—obtaining, automatically by the processor, at least one non-training document, wherein the non-training document includes at least respective content; at 207—applying to the non-training document, automatically by the processor, the classification model in order to classify the non-training document into one of at least two categories; at 209—monitoring, automatically by the processor, for attempted access to the non-training document; and at 211—taking action, automatically by the processor, when the monitoring determines the existence of the attempted access to the non-training document; wherein the action that is taken is based upon the category into which the non-training document to which access is attempted has been classified; and wherein the action that is taken comprises one of: (a) denying access to the non-training document to which access is attempted; (b) logging the attempted access to the non-training document to which access is attempted; and (c) a combination thereof.

In one specific example, possible categories could be: (1) in a simple embodiment, the categories would be BLOCK and ALLOW (two categories) where BLOCK would mean that the device does not allow the traffic/data to pass through (and ALLOW would mean that the device does allow the traffic/data to pass through); (2) in more complex embodiments, the categories may be aligned with a security classification used within the organization such as, for example, CONFIDENTIAL, PRIVATE, SENSITIVE, and PUBLIC and there may be different rules, behaviors or models associated with each category such as, for example, that PUBLIC is allowed to flow through, SENSITIVE is allowed to flow through but is logged, PRIVATE is allowed to flow through if the sending entity is on a white list, and CONFIDENTIAL is blocked.

In one specific example, the enforcement policy is enforced on at least one of: (a) an email component; (b) an end user device component; (c) a web component; (d) a network component; and (e) a combination thereof.

In another specific example, the end user device component comprises at least one of: (a) a desktop computer; (b) a laptop computer; (c) a tablet; (d) a smartphone; and (e) a combination thereof.

In another specific example, the web component comprises a proxy that sits between the internet and the internal network. All traffic in/out passes through this proxy. For example, a user may access a website and upload a file. The file will pass through this proxy and the rules/models applied. If the file content is classified with a level that requires action, the proxy will act to block the upload.

In another specific example, the network component comprises an IPS, firewall or other network device that inspects traffic flowing in/out. There are some specific network DLP platforms that fall into this category too.

In one specific example, the method may further comprise configuring software (e.g., a software agent) to prevent communication of the non-training document from a user device based on the category into which the non-training document is classified. In another example, any steps may be carried out in the order recited or the steps may be carried out in another order.

Figure 3:
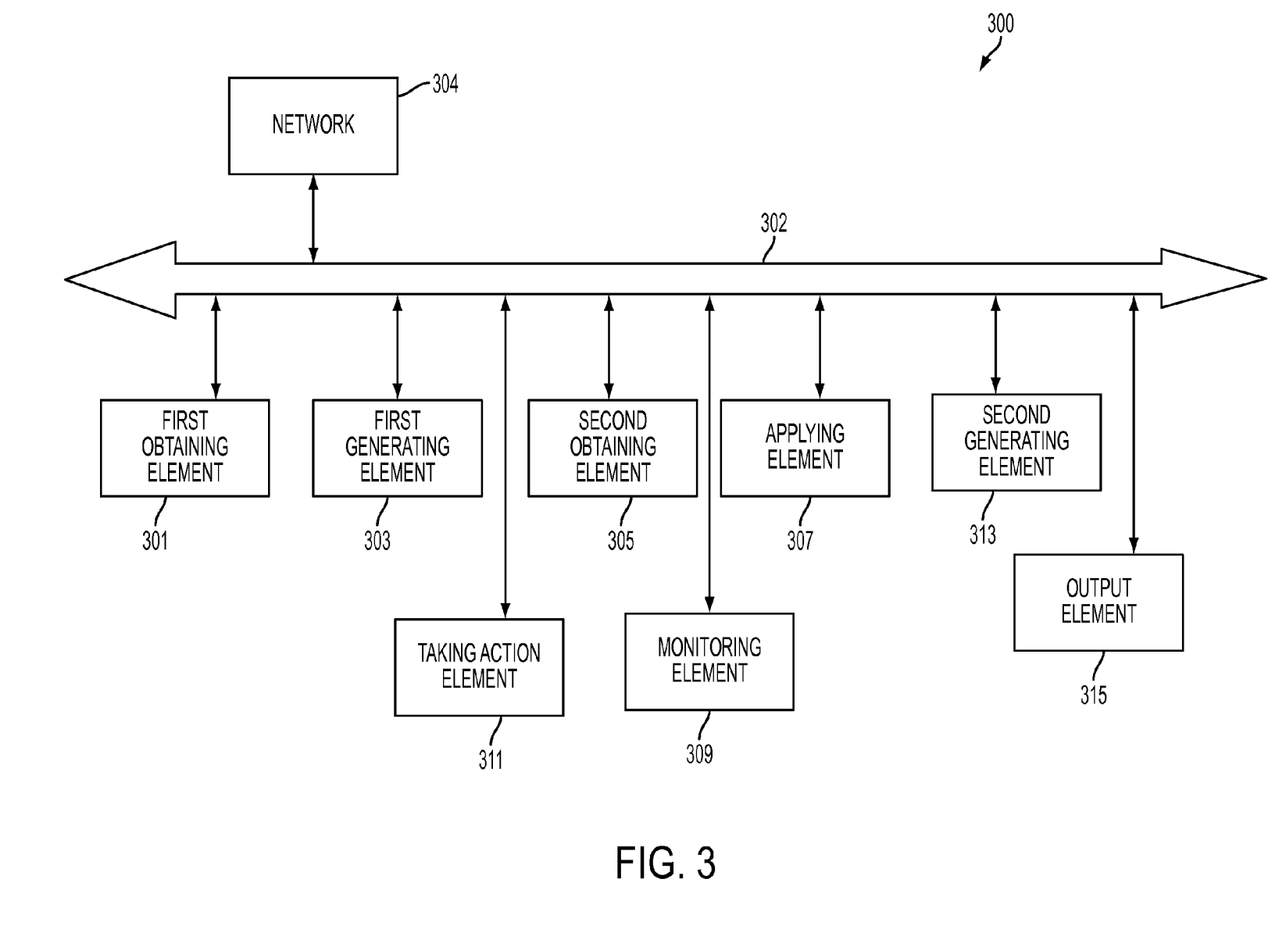
FIG. 3 depicts a block diagram of a system according to an embodiment of the present invention.

Referring now to FIG. 3, in another embodiment, a computer-implemented system 300 for automatic data leak prevention is provided. This system may include the following elements: a first obtaining element 301 configured to obtain automatically a plurality of training documents, each of the training documents including at least respective content and respective metadata; a first generating element 303 configured to generate automatically a classification model, wherein the classification model is generated, based at least in part upon the content and metadata of each of the training documents; a second obtaining element 305 configured to obtain automatically at least one non-training document, wherein the non-training document includes at least respective content; an applying element 307 configured to apply automatically to the non-training document the classification model in order to classify the non-training document into one of at least two categories; a monitoring element 309 configured to monitor automatically for attempted access to the non-training document; and a taking action element 311 configured to take action automatically when the monitoring determines the existence of the attempted access to the non-training document; wherein the action that is taken is based upon the category into which the non-training document to which access is attempted has been classified; and wherein the action that is taken comprises one of: (a) denying access to the non-training document to which access is attempted; (b) logging the attempted access to the non-training document to which access is attempted; and (c) a combination thereof. In one specific example, the taking action element 311 may comprise the proxy as described above that is in operative communication with the monitoring element 309 and a document storage system at which the non-training document is stored.

Still referring to FIG. 3, the system 300 may further comprise a second generating element 313 configured to generate automatically an enforcement policy, wherein the enforcement policy specifies the at least one action to be taken when the attempt is made to access a document having a predetermined category and an output element 315 configured to output the category into which the non-training document is classified.

Still referring to FIG. 3, each of the elements may be operatively connected together via system bus 302. In one example, communication between and among the various elements may be bi-directional. In another example, communication may be carried out via network 304 (e.g., the Internet, an intranet, a local area network, a wide area network and/or any other desired communication channel(s)). In another example, some or all of these elements may be implemented in a computer system of the type shown in FIG. 4.

Figure 4:
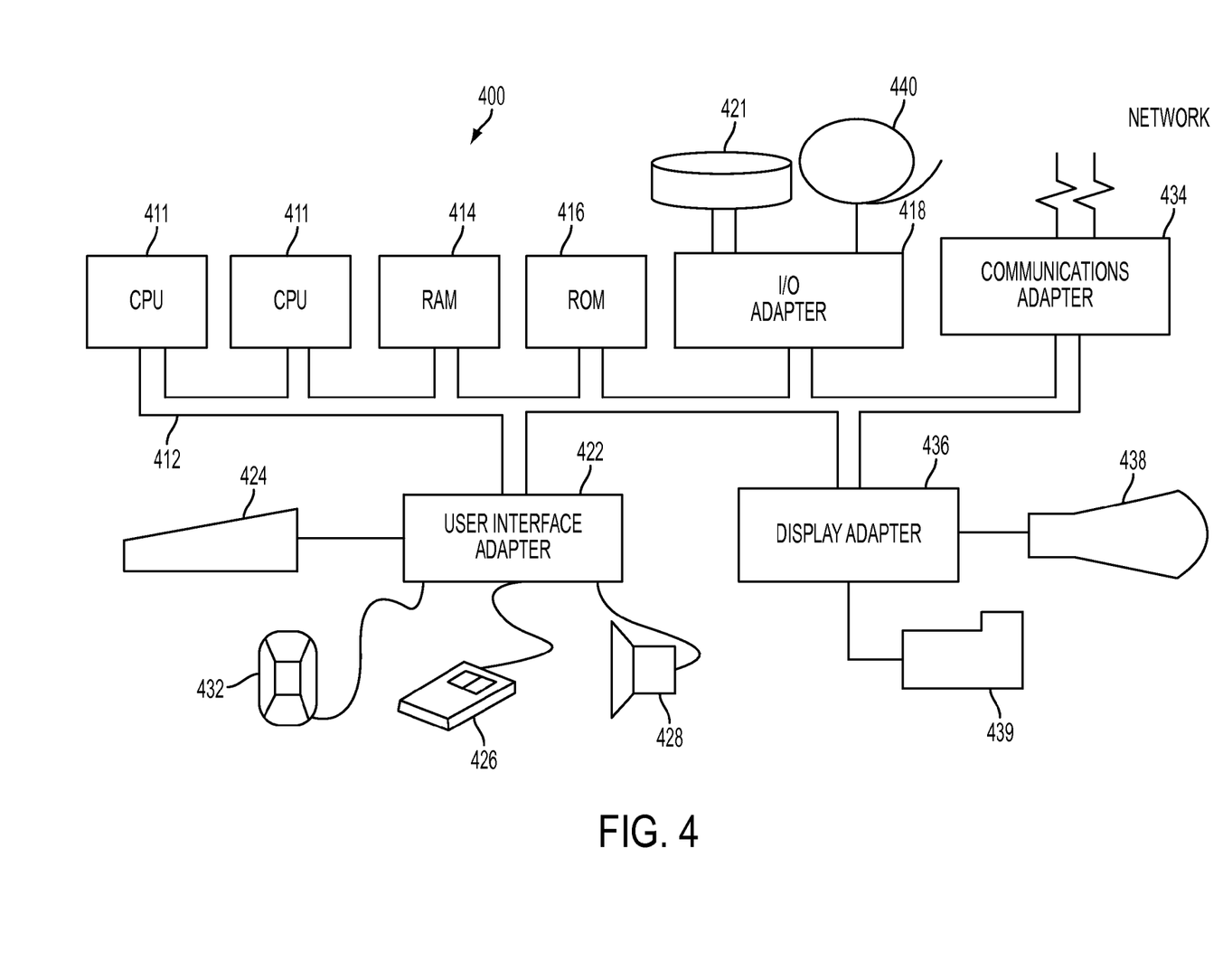
FIG. 4 depicts a block diagram of a system according to an embodiment of the present invention.

Referring now to FIG. 4, this figure shows a hardware configuration of computing system 400 according to an embodiment of the present invention. As seen, this hardware configuration has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communications adapter 434 for connecting the system 400 to a data processing network, the Internet, an Intranet, a local area network (LAN), etc., and a display adapter 436 for connecting the bus 412 to a display device 438 and/or printer 439 (e.g., a digital printer or the like).

In one embodiment, an automated method for data leak prevention is provided, the method comprising: obtaining, automatically by a processor, a plurality of training documents, each of the training documents including at least respective content and respective metadata; generating a classification model, automatically by the processor, wherein the classification model is generated, based at least in part upon the content and metadata of each of the training documents; obtaining, automatically by the processor, at least one non-training document, wherein the non-training document includes at least respective content; applying to the non-training document, automatically by the processor, the classification model in order to classify the non-training document into one of at least two categories; monitoring, automatically by the processor, for attempted access to the non-training document; and taking action, automatically by the processor, when the monitoring determines the existence of the attempted access to the non-training document; wherein the action that is taken is based upon the category into which the non-training document to which access is attempted has been classified; and wherein the action that is taken comprises one of: (a) denying access to the non-training document to which access is attempted; (b) logging the attempted access to the non-training document to which access is attempted; and (c) a combination thereof.

In one example, the training documents are obtained from a document management system.

In another example, the non-training document is obtained from a document management system.

In another example, the method further comprises generating, automatically by the processor, an enforcement policy, wherein the enforcement policy specifies the at least one action to be taken when the attempt is made to access a document having a predetermined category.

In another example, the action that is taken comprises permitting access to the non-training document to which access is attempted.

In another example, the action that is taken is permitting and logging access to the non-training document to which access is attempted.

In another example, the enforcement policy is enforced on at least one of: (a) an email component; (b) an end user device component; (c) a web component; (d) a network component; and (e) a combination thereof.

In another example: the end user device component comprises at least one of: (a) a desktop computer; (b) a laptop computer; (c) a tablet; (d) a smartphone; and (e) a combination thereof.

In another embodiment, a computer readable storage medium, tangibly embodying a program of instructions executable by the computer for automated data leak prevention is provided, the program of instructions, when executing, performing the following steps: obtaining automatically a plurality of training documents, each of the training documents including at least respective content and respective metadata; generating automatically a classification model, wherein the classification model is generated, based at least in part upon the content and metadata of each of the training documents; obtaining automatically at least one non-training document, wherein the non-training document includes at least respective content; applying automatically to the non-training document the classification model in order to classify the non-training document into one of at least two categories; monitoring automatically for attempted access to the non-training document; and taking action automatically when the monitoring determines the existence of the attempted access to the non-training document; wherein the action that is taken is based upon the category into which the non-training document to which access is attempted has been classified; and wherein the action that is taken comprises one of: (a) denying access to the non-training document to which access is attempted; (b) logging the attempted access to the non-training document to which access is attempted; and (c) a combination thereof.

In one example, the program of instructions, when executing, further perform: generating automatically an enforcement policy, wherein the enforcement policy specifies the at least one action to be taken when the attempt is made to access a document having a predetermined category.

In another example, the action that is taken comprises permitting access to the non-training document to which access is attempted.

In another example, the action that is taken is permitting and logging access to the non-training document to which access is attempted.

In another example, the enforcement policy is enforced on at least one of: (a) an email component; (b) an end user device component; (c) a web component; (d) a network component; and (e) a combination thereof.

In another example: the end user device component comprises at least one of: (a) a desktop computer; (b) a laptop computer; (c) a tablet; (d) a smartphone; and (e) a combination thereof.

In another embodiment, a computer-implemented system for automatic data leak prevention is provided, the system comprising: a first obtaining element configured to obtain automatically a plurality of training documents, each of the training documents including at least respective content and respective metadata; a first generating element configured to generate automatically a classification model, wherein the classification model is generated, based at least in part upon the content and metadata of each of the training documents; a second obtaining element configured to obtain automatically at least one non-training document, wherein the non-training document includes at least respective content; an applying element configured to apply automatically to the non-training document the classification model in order to classify the non-training document into one of at least two categories; a monitoring element configured to monitor automatically for attempted access to the non-training document; and a taking action element configured to take action automatically when the monitoring determines the existence of the attempted access to the non-training document; wherein the action that is taken is based upon the category into which the non-training document to which access is attempted has been classified; and wherein the action that is taken comprises one of: (a) denying access to the non-training document to which access is attempted; (b) logging the attempted access to the non-training document to which access is attempted; and (c) a combination thereof.

In another example, the system further comprises: a second generating element configured to generate automatically an enforcement policy, wherein the enforcement policy specifies the at least one action to be taken when the attempt is made to access a document having a predetermined category.

In another example, the action that is taken comprises permitting access to the non-training document to which access is attempted.

In another example, the action that is taken is permitting and logging access to the non-training document to which access is attempted.

In another example, the enforcement policy is enforced on at least one of: (a) an email component; (b) an end user device component; (c) a web component; (d) a network component; and (e) a combination thereof.

In another example, the system further comprises an output element configured to output the category into which the non-training document is classified.

In other examples, any steps described herein may be carried out in any appropriate desired order.

In another example, the predictive models developed by the disclosed mechanisms (that is, the classification models) can be used to enforce DLP reactively (e.g., in response to an attempted breach).

In another example, the predictive models developed by the disclosed mechanisms (that is, the classification models) can be deployed proactively. For example, an agent scans all the fileservers in an enterprise applying the appropriate policies and then produces a report of documents that appear to contain highly restricted or confidential data, yet are being stored in unstructured and open filestores such as Windows fileshares.

In one specific example, one advantage of one or more of the disclosed mechanisms over conventional methods is that such disclosed mechanisms do not rely on a human's ability to predict the likely "patterns" for highly sensitive data.

In another specific example, one advantage of one or more of the disclosed mechanisms over conventional methods is that such disclosed mechanisms do not require extensive human management to maintain.

As described herein, various embodiments may be applied in the context of vulnerability detection and risk management (e.g., in connection with one or more filestores and/or one or more databases).

As described herein, various embodiments may be applied in the context of integration with an existing document management system. Further, as described herein, various embodiments may derive models based on content in that document management system and then build policies based on these modes (wherein such policies are then pushed out to end point protection software and others).

As described herein, various embodiments may provide data leak prevention that learns and adapts to automate classification of protected data. The data leak protection may build classification models based on data in structured and/or unstructured file stores. The generated models may be used by a policy engine in order to derive access policies.

In other examples, various embodiments may provide one or more of the following: (a) a federated model wherein policies can be deployed to both endpoint and perimeter DLP devices; (b) application of natural language processing to generate one or more models and/or one or more enforcement policies; (c) automatically evolve as an organization evolves in its focus and classification of what it considers materially sensitive (e.g., based on its current business operations); (d) does not (in one example) require that a document contain metadata but rather it generates its own classification model(s) and applies these to document content; and/or (e) automated generation of one or more models and the automated deployment of one or more policies to multiple DLP solutions.

As described herein, various embodiments provide for automation (i.e., do not require significant human involvement) to create policies (because, in these embodiments, models/rules may be generated from an existing document management system or systems).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. An automated method for data leak prevention, the method comprising:
    obtaining, by a processor, a plurality of training documents and corresponding meta data associated with each training document from a document management system associated with a party, each of the training documents comprising at least one respective content, the corresponding metadata associated with each training document comprising a security classification set by the party in the document management system, the security classification classifying the training document associated with the corresponding metadata into one of at least two security categories;
    in response to obtaining the plurality of training documents from the document management system, converting each training document into a feature set comprising at least one pairing of a feature of the respective content of the respective training document with the security classification of the respective training document found in the corresponding metadata associated with the respective training document;
    generating, by the processor, a classification model based at least in part upon the pairings found in the feature sets of each of the training documents, wherein the generated classification model comprises at least one correlation between the features found in the respective content of each training document and the security classification found in the corresponding metadata associated with each training document;
    obtaining, by the processor, at least one non-training document, wherein the at least one non-training document comprises at least one respective content;
    in response to obtaining the at least one non-training document, applying, by the processor, the generated classification model to the at least one non-training document, the application of the classification model to the at least one non-training document comprising:
        correlating the at least one respective content of the at least one non-training document to a security classification of the at least one non-training document based on the at least one correlation in the generated classification model; and
        classifying the at least one non-training document into one of the at least two security categories based on the correlation of the at least one respective content of the at least one non-training document to the security classification;
    monitoring the at least one non-training document, by the processor, for attempted access to the at least one non-training document;
    detecting, by the processor, based on the monitoring, an attempted access to the at least one non-training document;
    in response to detecting an attempted access to the at least one non-training document, taking, by the processor, a predetermined action;
    wherein the predetermined action that is taken is based upon the one of the at least two categories into which the at least one non-training document has been classified by the application of the generated classification model; and
    wherein the predetermined action that is taken comprises one of: (a) denying access to the at least one non-training document to which access is attempted; (b) logging the attempted access to the at least one non-training document to which access is attempted; and (c) a combination thereof.

2. The method of claim 1, wherein the non-training document is obtained from a document management system.

3. The method of claim 1, further comprising generating, by the processor, an enforcement policy, wherein the enforcement policy specifies the at least one action to be taken when the attempt is made to access a document having a predetermined category.

4. The method of claim 1, wherein the action that is taken comprises permitting access to the non-training document to which access is attempted.

5. The method of claim 4, wherein the action that is taken is permitting and logging access to the non-training document to which access is attempted.

6. The method of claim 3, wherein the enforcement policy is enforced on at least one of: (a) an email component; (b) an end user device component; (c) a web component; (d) a network component; and (e) a combination thereof.

7. The method of claim 6, wherein:
    the end user device component comprises at least one of: (a) a desktop computer; (b) a laptop computer; (c) a tablet; (d) a smartphone; and (e) a combination thereof.

8. A computer readable storage medium, tangibly embodying a program of instructions executable by the computer for automated data leak prevention, the program of instructions, when executing, performing the following steps:
    obtaining a plurality of training documents and corresponding meta data associated with each training document from a document management system associated with a party, each of the training documents comprising at least one respective content, the corresponding metadata associated with each training document comprising a security classification set by the party in the document management system, the security classification classifying the training document associated with the corresponding metadata into one of at least two security categories;
    in response to obtaining the plurality of training documents from the document management system, converting each training document into a feature set comprising at least one pairing of a feature of the respective content of the respective training document with the security classification of the respective training document found in the corresponding metadata associated with the respective training document;
    generating a classification model based at least in part upon the pairings found in the feature sets of each of the training documents, wherein the generated classification model comprises at least one correlation between the features found in the respective content of each training document and the security classification found in the corresponding metadata associated with each training document;

obtaining at least one non-training document, wherein the at least one non-training document comprises at least one respective content;
in response to obtaining the at least one non-training document, applying the generated classification model to the at least one non-training document the application of the classification model to the at least one non-training document comprising:
    correlating the at least one respective content of the at least one non-training document to a security classification of the at least one non-training document based on the at least one correlation in the generated classification model;
    classifying the at least one non-training document into one of the at least two categories based on the correlation of the at least one respective content of the at least one non-training document to the security classification;
monitoring the at least one non-training document for attempted access to the at least one non-training document;
detecting, based on the monitoring, an attempted access to the at least one non-training document;
in response to detecting an attempted access to the at least one non-training document, taking a predetermined action;
wherein the predetermined action that is taken is based upon the one of the at least two categories into which the at least one non-training document has been classified by the application of the generated classification model; and
wherein the predetermined action that is taken comprises one of: (a) denying access to the at least one non-training document to which access is attempted; (b) logging the attempted access to the at least one non-training document to which access is attempted; and (c) a combination thereof.

9. The computer readable storage medium of claim 8, wherein the program of instructions, when executing, further perform:
    generating an enforcement policy, wherein the enforcement policy specifies the at least one action to be taken when the attempt is made to access a document having a predetermined category.

10. The computer readable storage medium of claim 8, wherein the action that is taken comprises permitting access to the non-training document to which access is attempted.

11. The computer readable storage medium of claim 8, wherein the action that is taken is permitting and logging access to the non-training document to which access is attempted.

12. The computer readable storage medium of claim 9, wherein the enforcement policy is enforced on at least one of: (a) an email component; (b) an end user device component; (c) a web component; (d) a network component; and (e) a combination thereof.

13. The computer readable storage medium of claim 12, wherein:
    the end user device component comprises at least one of: (a) a desktop computer; (b) a laptop computer; (c) a tablet; (d) a smartphone; and (e) a combination thereof.

14. A computer-implemented system for automatic data leak prevention, the system comprising:
    a first obtaining element configured to obtain a plurality of training documents and corresponding meta data associated with each training document from a document management system associated with a party, each of the training documents comprising at least one respective content, the corresponding metadata associated with each training document comprising a security classification set by the party in the document management system, the security classification classifying the training document associated with the corresponding metadata into one of at least two security categories;
    a converting element configured to, in response to obtaining the plurality of training documents from the document management system, convert each training document into a feature set comprising at least one pairing of a feature of the respective content of the respective training document with the security classification of the respective training document found in the corresponding metadata associated with the respective training document;
    a first generating element configured to generate a classification model based at least in part upon the pairings found in the feature sets of each of the training documents, wherein the generated classification model comprises at least one correlation between the features found in the respective content of each training document and the security classification found in the corresponding metadata associated with each training document;
    a second obtaining element configured to obtain at least one non-training document, wherein the at least one non-training document comprises at least one respective content;
    an applying element configured to apply, in response to the second obtaining element obtaining the at least one non-training document, the generated classification model to the at least one non-training document, the application of the classification model to the at least one non-training document comprising:
        correlating the at least one respective content of the at least one non-training document to a security classification of the at least one non-training document based on the at least one correlation in the generated classification model;
        classifying the at least one non-training document into one of the at least two categories based on the correlation of the at least one respective content of the at least one non-training document to the security classification;
    a monitoring element configured to monitor the at least one non-training document for attempted access to the at least one non-training document and detect based on the monitoring an attempted access to the at least one non-training document;
    a taking action element configured to, in response to detecting an attempted access to the at least one non-training document, take a predetermined action;
    wherein the predetermined action that is taken is based upon the one of the at least two categories into which the at least one non-training document has been classified by the applying element; and
    wherein the predetermined action that is taken comprises one of: (a) denying access to the at least one non-training document to which access is attempted; (b) logging the attempted access to the at least one non-training document to which access is attempted; and (c) a combination thereof.

15. The system of claim 14, further comprising:
    a second generating element configured to generate an enforcement policy, wherein the enforcement policy specifies the at least one action to be taken when the attempt is made to access a document having a predetermined category.

16. The system of claim 14, wherein the action that is taken comprises permitting access to the non-training document to which access is attempted.

17. The system of claim 14, wherein the action that is taken is permitting and logging access to the non-training document to which access is attempted.

18. The system of claim 15, wherein the enforcement policy is enforced on at least one of: (a) an email component; (b) an end user device component; (c) a web component; (d) a network component; and (e) a combination thereof.

19. The system of claim 14, further comprising an output element configured to output the category into which the non-training document is classified.

\* \* \* \* \*